United States Patent
Park et al.

(10) Patent No.: US 10,523,320 B2
(45) Date of Patent: Dec. 31, 2019

(54) DEVICE IMPLEMENTING VISIBLE LIGHT COMMUNICATIONS AND WIRELESS NETWORK COMMUNICATIONS IN DUAL MODE AND METHOD OF IMPLEMENTING THEREOF

(71) Applicant: LG ELECTRONICS INC., Seoul (KR)

(72) Inventors: Hee Gu Park, Seoul (KR); Seungwoo Shin, Seoul (KR); Kyuran Lee, Seoul (KR); Yeon Sub Jin, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 15/864,555

(22) Filed: Jan. 8, 2018

(65) Prior Publication Data
US 2019/0020413 A1    Jan. 17, 2019

(30) Foreign Application Priority Data
Jul. 11, 2017    (KR) ........................ 10-2017-0088063

(51) Int. Cl.
*H04B 10/116*    (2013.01)
*H04W 4/80*    (2018.01)
*H04W 76/10*    (2018.01)
*H04W 4/02*    (2018.01)
*H04W 4/70*    (2018.01)

(52) U.S. Cl.
CPC ............ *H04B 10/116* (2013.01); *H04W 4/80* (2018.02); *H04W 76/10* (2018.02); *H04W 4/02* (2013.01); *H04W 4/70* (2018.02)

(58) Field of Classification Search
None
See application file for complete search history.

(56) References Cited

U.S. PATENT DOCUMENTS

| | | | |
|---|---|---|---|
| 5,926,302 A * | 7/1999 | Hirohashi | H04B 10/11 398/119 |
| 2009/0109925 A1* | 4/2009 | Nakamura | H04L 63/062 370/331 |
| 2013/0136033 A1* | 5/2013 | Patil | H04W 84/18 370/255 |
| 2016/0134366 A1* | 5/2016 | Elgala | H04B 10/116 398/130 |
| 2017/0103647 A1* | 4/2017 | Davis | G06F 1/3287 |
| 2017/0288774 A1* | 10/2017 | Ryan | H04B 10/116 |
| 2017/0339000 A1* | 11/2017 | Wennemyr | G06F 9/223 |

* cited by examiner

*Primary Examiner* — David W Lambert
(74) *Attorney, Agent, or Firm* — KED & Associates, LLP

(57) ABSTRACT

Disclosed herein are a dual-mode device operating in a visible light communications mode and a wireless network communications mode, and a method performed by the device. The visible light communications device includes a wireless network communications unit including a fixed identifier and performing communications based on a wireless protocol, a visible light transmitting unit transmitting the fixed identifier using a visible light communications protocol, and a controller (control unit) controlling the visible light transmitting unit so that it selectively transmits the fixed identifier using the visible light communications protocol depending on whether the wireless network communications unit is connected to a wireless network.

9 Claims, 16 Drawing Sheets

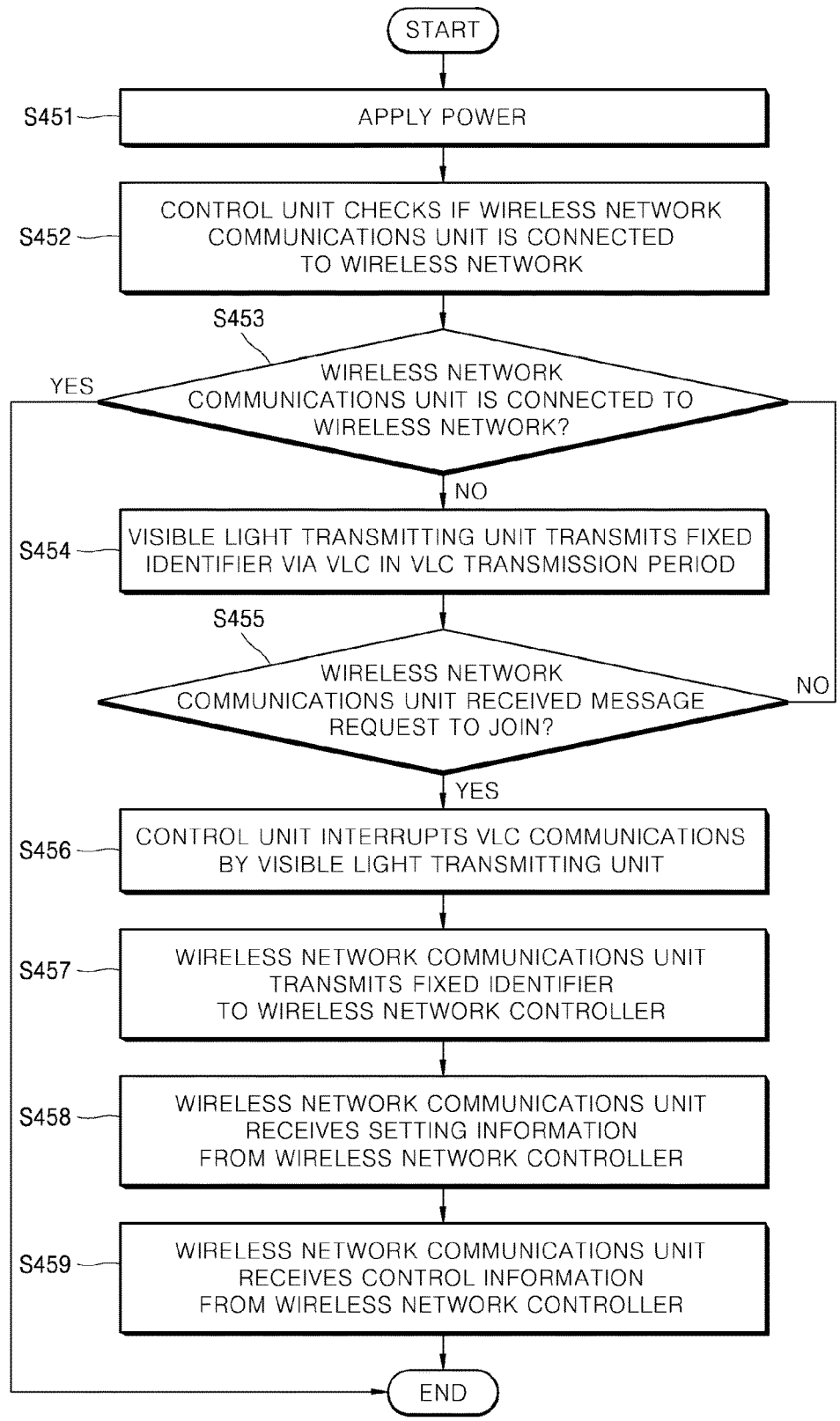

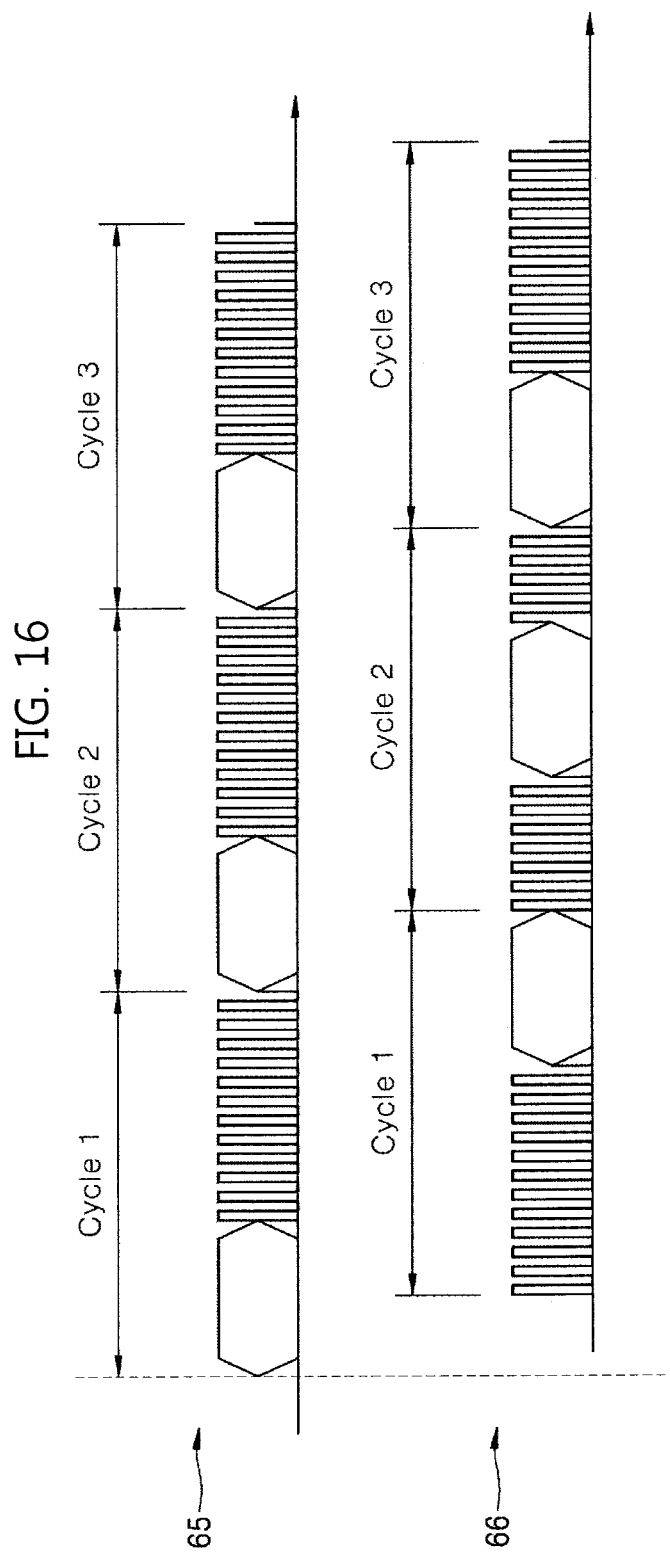

DEVICE IMPLEMENTING VISIBLE LIGHT COMMUNICATIONS AND WIRELESS NETWORK COMMUNICATIONS IN DUAL MODE AND METHOD OF IMPLEMENTING THEREOF

CROSS-REFERENCE TO RELATED APPLICATION

This application claims the priority of Korean Patent Application No. 2017-0088063 filed on Jul. 11, 2017, in the Korean Intellectual Property Office, the disclosure of which is hereby incorporated by reference in its entirety.

BACKGROUND

1. Field

The present disclosure relates to a dual-mode device operating in a visible light communications mode and a wireless network communications mode, and a method performed by the device.

2. Background

As the internet of things (IoT) or machine-to-machine (M2M) communications are increasingly discussed, a variety of techniques have been proposed in association with network connection between objects and communications over such network. Further, devices capable of working as these objects are increasingly employed in a variety of industrial fields.

There are a number of techniques that allow devices such as a luminaire, a switch or the like to work as objects of IoT. In order for devices to connect to a network to perform communications, initially a device may attempt to couple with the network according to the protocol of the network. However, if there are a great number of devices in a single room or adjacent rooms, it is very inefficient to connect the devices with the network one by one. If these devices are connected to the network automatically at a time, it is difficult to identify the devices, and there may be an error to do so.

In view of the above, a method for connecting a device to a network by reflecting characteristics of places by using visible light communications, and a device performing the method will be described.

BRIEF DESCRIPTION OF THE DRAWINGS

The embodiments will be described in detail with reference to the following drawings in which like reference numerals refer to like elements wherein:

FIG. 15 is a flowchart for illustrating an operation process by a visible light communications device according to an exemplary embodiment of the present disclosure; and FIG. 16 is a diagram for illustrating a process of setting a VLC transmission period at random by a plurality of visible light communications devices according to an exemplary embodiment of the present disclosure.

DETAILED DESCRIPTION

In some implementations, features may be described as being performed by separate elements for convenience of illustration. However, these features may be implemented by a single device or module or a feature may be implemented by several devices or modules.

Hereinafter, operations and configurations of a plurality of visible light communications (VLC) devices located in a room, and a wireless network controller establishing network connection of the devices will be described in detail. The plurality of devices located in a room may include luminaires, electronic products and other devices disposed in a building. Each of the devices may include a visible light communications module for performing visible light communications and a wireless network communications module. Although a luminaire is described as an example of the device connecting to a network for convenience of illustration, this is merely illustrative. The exemplary embodiments of the present disclosure can be applied to any device using visible light communications. More than one controller may be disposed. The controller(s) may control assignment of network addresses to the devices to allow them to connect to the network.

Figure 1:
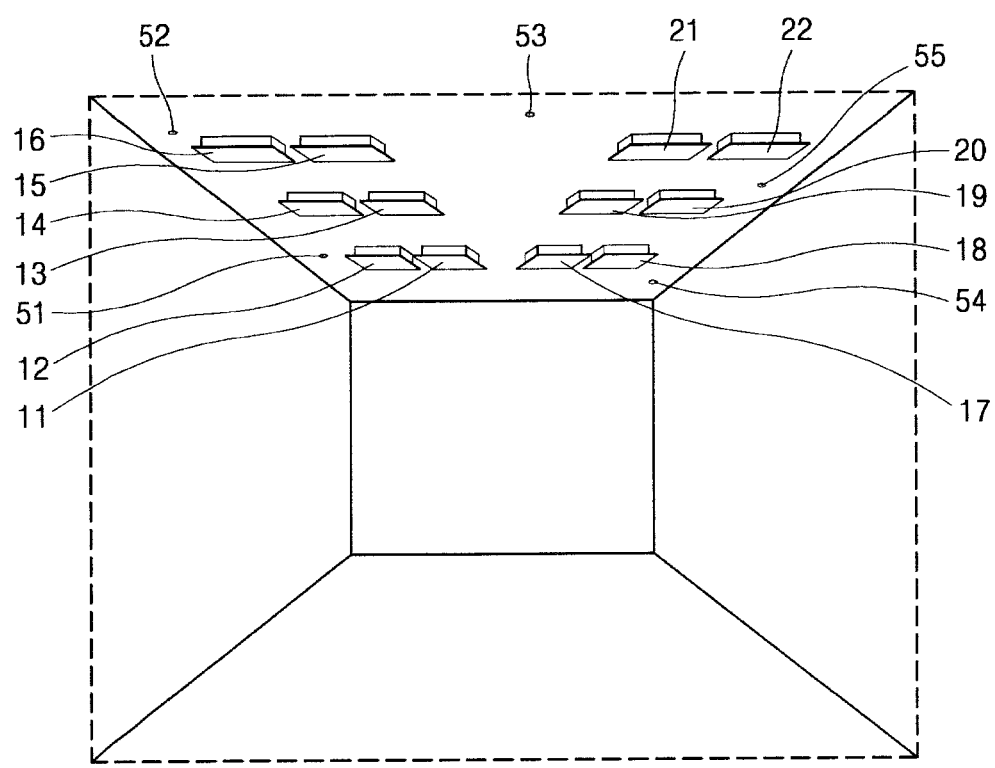
FIG. 1 is a view showing a room where an exemplary embodiment of the present disclosure is applied.

FIG. 1 is a view showing a room where an exemplary embodiment of the present disclosure is applied. In the room, a plurality of luminaires 11 to 22 is disposed. In addition to the luminaires, sensors 51 to 55 are disposed to sense changes in the room. The luminaires 11 to 22 and the sensors 51 to 55 may be disposed in a large room such as an office, and may be connected to a network such as Zigbee or Bluetooth and controlled remotely or centrally. For example, a personal area network (PAN) may be employed. However, this is merely an example, and WiFi or the like may also be employed. When the luminaires 11 to 22 and the sensors 51 to 55 are connected to the network, information can be exchanged among them.

When a plurality of devices is disposed in a room as shown in FIG. 1, it is necessary to assign addresses to the devices to connect to a wireless network. According to an existing method of registering the address information of several individual devices, all of the devices responding to a request to assign an address are shown. As a result, it is difficult to find and register a device of interest from among the devices. In particular, when most of the devices are of the same type as shown in FIG. 1, e.g., luminaires and sensors, it is likely to have an error in identifying and registering the devices one by one.

Hereinafter, a way of transmitting a fixed identifier used to identify a nearby device from another using visible light communications so as to connect the device to a wireless network using visible light communications will be described in detail below. Then, a new wireless network identifier is used to connect a variety of devices to a wireless network using communications in the wireless network. For example, the above-described devices may be luminaires, sensors, etc.

Examples of the devices using visible light communications include a switch, a thermometer, a clock, etc., as well as the above-described luminaires and sensors.

In addition, the wireless network controller that controls registration of devices using visible light communications with a network may be a portable device such as a smartphone and a table PC. In addition, the portable device may be a dedicated wireless network controller for establishing a network in the room. Herein, the terms a wireless network controller, a portable device, a remote controller and the like may be used interchangeably. However, the present disclosure is not limited thereby.

Herein, examples of the network include a personal area network (PAN). For example, if the network in the room is a Zigbee network using the Zigbee protocol, a router capable of conducting Zigbee communications may be an example of the controller. For another example, if the network for the room is a Bluetooth network using the Bluetooth protocol, a device capable of conducting Bluetooth communications and of working as a master device may be an example of the controller. In addition, ultra wideband (UWB) may be employed as well.

Figure 2:
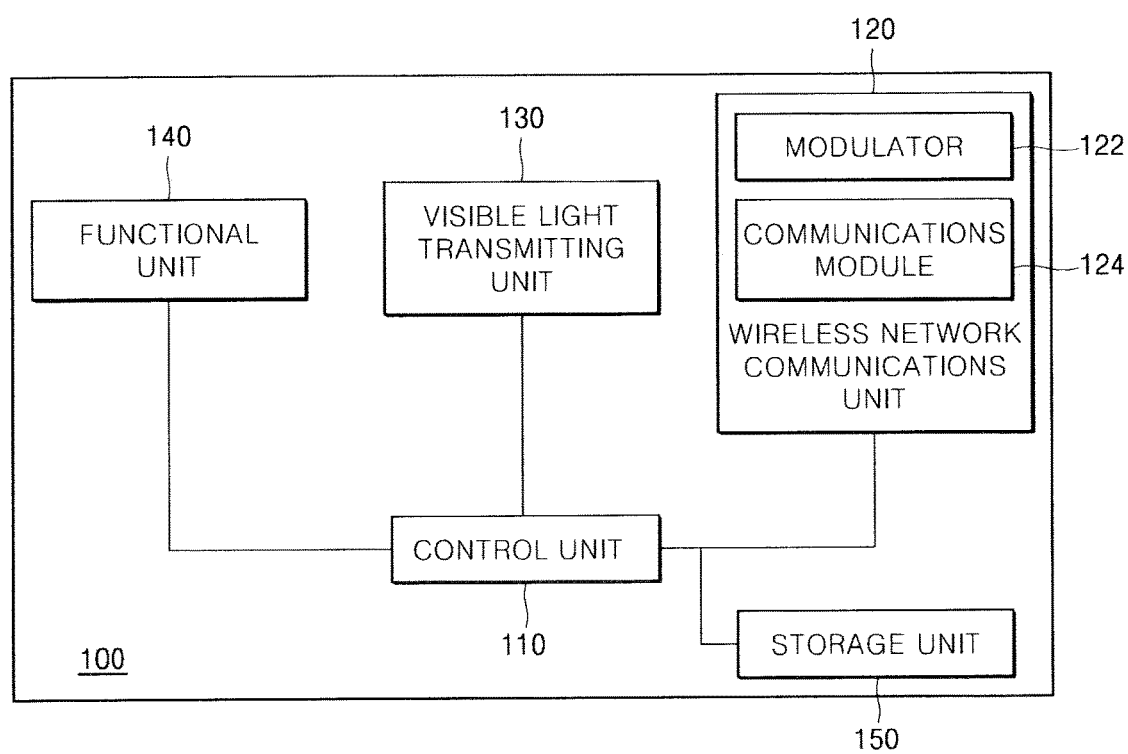
FIG. 2 is a block diagram of a visible light communications device according to an exemplary embodiment of the present disclosure.

FIG. 2 is a block diagram of a visible light communications device according to an exemplary embodiment of the present disclosure. The visible light communications device 100 includes a controller (control unit) 110, a wireless network communications unit 120, a visible light transmitting unit 130, a functional unit 140, and a storage unit 150. Optionally, the wireless network communications unit 120 may include a modulator 122 and a communications module 124 or may include them as a single element. The communications module 124 transmits and receives data using a specific communications protocol. If the wireless network is a Zigbee network, the communications module 124 may be a Zigbee communications module. The modulator 122 may encode a fixed identifier, and the visible light transmitting unit 130 may output the encoded fixed identifier.

The controller (control unit) 110 and the wireless network communications unit 120 may also be implemented as a single element such as one chip. In addition, the storage unit 150 may store the information set during communications processes over the wireless network. The storage unit 150 may also be incorporated into the controller (control unit) 110. The storage unit 150 includes a memory element. The storage unit 150 can be abbreviated as storage. The control unit 110 can be abbreviated as controller.

The wireless network communications unit 120 performs communications based on a wireless protocol and includes a fixed identifier. In an exemplary embodiment, the fixed identifier may be media access control (MAC) address of the wireless network communications unit. Alternatively, in another exemplary embodiment where the control unit 110 and the wireless network communications unit 120 are implemented as a single element, the fixed identifier may be the MAC address of the control unit 110. The network communications unit 120 may include a variety of wireless network communications protocols such as a Zigbee communications module, a Bluetooth communications module, a UWB communications module and a WiFi communications module depending on the types of the initial network and the target network.

The visible light transmitting unit 130 transmits the fixed identifier included in the wireless network communications units 120 based on the visible light communications protocol. In doing so, under the control of the controller (control unit) 110, the visible light transmitting unit 130 transmits the fixed identifier based on the visible light communications protocol on the condition that the wireless network communications unit 120 is not connected to the wireless network. Thereafter, when the wireless network communications unit 120 is connected to the wireless network, the visible light transmitting unit 130 changes outputting of the fixed identifier. The changing the output of the fixed identifier includes interrupting the transmission of the fixed identifier and extending the transmission interval of the fixed identifiers.

In addition, when the wireless network communications unit 120 is disconnected from the wireless network, the visible light transmitting unit 130 may also transmit the fixed identifier based on the visible light communications protocol under the control of the controller (control unit) 110.

That is, under the control of the controller (control unit) 110 of the visible light communications device 100, the fixed identifier may be transmitted using the visible light only when the wireless network communications unit 120 is not connected to the wireless network. The controller (control unit) 110 may control the visible light transmitting unit 130 so that it selectively transmits the fixed identifier using the visible light communications protocol based on whether the wireless network communications unit 120 is connected to the wireless network.

The selectively transmitting the fixed identifier may include two examples. When the wireless network communications unit 120 is not connected to the wireless network, the visible light transmitting unit 130 of the visible light communications device 100 transmits the fixed identifier at a first interval using the visible light communications protocol. On the other hand, when the wireless network communications unit 120 is connected to the wireless network, the visible light transmitting unit 130 of the visible light communications device 100 transmits the fixed identifier at a second interval using the visible light communications protocol. The first interval may be shorter than a second interval. Alternatively, the second interval becomes zero and thus the visible light transmitting unit 130 may no longer transmit the fixed identifier.

In another embodiment, the controller (control unit) 110 receives information indicating that the wireless network communications unit 120 is to be disconnected from the wireless network after a specific point in time. Then, the controller (control unit) 110 may control the visible light transmitting unit 130 in advance so that it transmits the fixed identifier based on the visible light communications protocol before and after the point in time.

The functional unit 140 is an element to perform a particular function assigned to the visible light communications device 100. If the visible light communications device 100 is a sensor, the functional unit 140 is a sensing module, for example. If the visible light communications device 100 is a luminaire, the functional unit 140 is a module such as an LED, for example. In this example, the visible light transmitting unit 130 and the functional unit 140 may be combined as a single element.

The visible light communications unit 130 transmits the first identifier using the visible light communications protocol. The fixed identifier may be an MAC address of the wireless network communications unit 120 or the controller (control unit) 110. In addition, the fixed identifier may be an MAC address of the visible light communications device 100. As mentioned earlier, in the initial state where the visible light communications device 100 such as a luminaire and a sensor is powered with no connection to the wireless network, the visible light transmitting unit 130 of the visible light communications device 100 transmits its fixed identifier, e.g., an MAC address, via the visible light.

Thereafter, after connection to the wireless network has been established, e.g., after connection to the wireless network is completed by the wireless network controller 200, the visible light communications unit 130 may no longer transmit the fixed identifier via the visible light.

The controller (control unit) 110 controls the network communications unit 120, the visible light communications unit 130 and the functional unit 140 to thereby control the operation of the visible light communications device 100.

Summarizing the description with respect to FIG. 2, the fixed identifier is sent via the visible light communications when the visible light communications devices 100 are newly powered and thus they need to connect to a new wireless network. Alternatively, the visible light communications devices 100 send the fixed identifiers via the visible light communications only when the previous connection to the wireless network is released. As a result, the wireless network controller 200 that sets up the wireless network can check and store the fixed identifier transmitted via the visible light communications, and can newly set the wireless network based on the stored fixed identifier.

In exemplary embodiment, the visible light communications devices 100 are not always enabled to conduct VLC transmission using the visible light communications protocol, but are enabled only when they are not connected to the wireless network, or only when the connection is expected to be released. This includes the visible light communication device 100 performing efficient visible light communication based on the connection state of the wireless network. That is, the visible light communications devices 100 can operate in a dual mode, i.e., in a fixed identifier transmission mode using a visible light communications protocol and in a fixed identifier transmission mode using a wireless network communications protocol.

Figure 3:
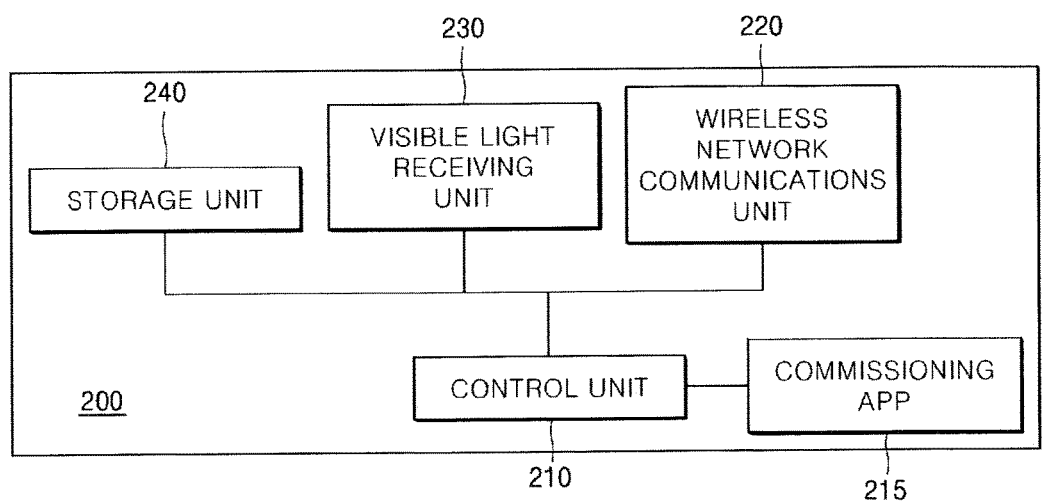
FIG. 3 is a block diagram of a wireless network controller according to an exemplary embodiment of the present disclosure.

FIG. 3 is a block diagram of a wireless network controller according to an exemplary embodiment of the present disclosure.

The wireless network communications unit 220 performs communications based on a wireless protocol. The visible light receiving unit 230 receives a first fixed identifier from the visible light communications device using the visible light communications protocol. The visible light receiving unit 230 may be a kind of luminance sensors. The first fixed identifier may be, for example, the MAC address of the wireless network communications unit 120 or the controller (control unit) 110 included in the visible light communications devices, as described above.

The first fixed identifier received by the visible light receiving unit 230 is stored in a predetermined group under the control of the controller 210. The predetermined group refers to a group created for each space, each floor, or a physical partition or logical partition. The first fixed identifiers transmitted by the visible light communications devices 100 based on the visible light protocol are stored in the respective groups. The storage unit 240 may store the first fixed identifiers as shown in Table 1 below. There are two groups Group01 and Group02, and VID(00001) to VID(00008) are the first fixed identifiers of the visible light communications devices 100, respectively, received via visible light communications. That is, VID(00001) refers that the fixed identifier (VLC_ID or VID) received via the VLC has "00001." The storage unit 240 can be abbreviated as storage. The control unit 210 can be abbreviated as controller.

The COM_ID is information on a fixed identifier received using the wireless network. While receiving the first fixed identifier via a visible light communications, it may not be set yet. Alternatively, the COM_ID is used to see if it is identical to the VLC_ID, and accordingly it may be used for comparison without being stored separately. The NET_ID is the identifier assigned in the wireless network and is not fixed but may be newly assigned when the network is disconnected. It is to be noted that the NET_ID is firstly used to identify each visible light communications device on the wireless network.

TABLE 1

| GroupID | VLC_ID | COM_ID | NET_ID |
|---------|-----------|--------|--------|
| Group01 | VID(00001) | | |
| Group01 | VID(00002) | | |
| Group01 | VID(00003) | | |
| Group01 | VID(00004) | | |
| Group02 | VID(00005) | | |
| Group02 | VID(00006) | | |
| Group02 | VID(00007) | | |
| Group02 | VID(00008) | | |

After collecting the first fixed identifiers as shown in Table 1, the controller (control unit) 210 of FIG. 3 controls the wireless network communications unit 220 so that it sends a first message requesting to join a first wireless network to one or more visible light communications devices. In doing so, the wireless network communications unit 120 of the visible light communications device 100 that has received the first message transmits a second fixed identifier, which is identical to the first fixed identifier which was transmitted previously. Accordingly, the wireless network communications unit 220 of the wireless network controller 200 receives the second fixed identifier. Then, the wireless network controller 200 searches the storage unit 240 for the first fixed identifier having the same value as the second fixed identifier. As a result of the search, if the found first fixed identifier is not connected to the first wireless network (for example, if the COM_ID in Table 1 is blank), the wireless network controller may control the visible light communications device so that it connects to the first wireless network.

Table 2 shows an example in which a second fixed identifier of some visible light communications device is received and stored using wireless network communications such as ZigBee. After comparing with the stored first fixed identifier, the identical second fixed identifier is stored. COM (00001) to COM (00003) are fixed identifiers received using wireless network communication. Table 2 shows the stored second fixed identifiers transmitted by the wireless network communications units of some visible light communications devices. COM (00001) refers to the identifier "00001" received in the process of wireless network communications. By checking "00001," it is determined whether it the same identifier received previously using the VLC.

TABLE 2

| GroupID | VLC_ID | COM_ID | NET_ID |
| --- | --- | --- | --- |
| Group01 | VID(00001) | COM(00001) | |
| Group01 | VID(00002) | COM(00002) | |
| Group01 | VID(00003) | COM(00003) | |
| Group01 | VID(00004) | | |
| Group02 | VID(00005) | | |
| Group02 | VID(00006) | | |
| Group02 | VID(00007) | | |
| Group02 | VID(00008) | | |

After completing the communications connection to the wireless network, various communications data may be transmitted and received based on the wireless network. For example, when connected to a ZigBee network, the visible light communications devices may be controlled group-by-group or individually. In addition, in the process of creating a ZigBee network, a Pan ID network key of a channel may be transmitted and received, and pairing may be performed by transmitting attribute data.

The completing the communications connection to the wireless network means that a separate identifier to be used in the wireless network is given to each of the visible light communications devices. For example, the node ID (2 bytes) used in the ZigBee network may be set in NET_ID. The example shown in Table 3 will be described. The value set as NET_ID is valid only when the visible light communications device is connected to the wireless network and is invalid when the connection is released or the wireless network is removed. In this case, the visible light communication device may transmit a fixed identifier such as a MAC address based on the VLC communications protocol until it is connected to a new wireless network.

TABLE 3

| GroupID | VLC_ID | COM_ID | NET_ID |
| --- | --- | --- | --- |
| Group01 | VID(00001) | COM(00001) | 6A8C |
| Group01 | VID(00002) | COM(00002) | 72D1 |
| Group01 | VID(00003) | COM(00003) | 9C05 |
| Group01 | VID(00004) | COM(00004) | 071D |
| Group02 | VID(00005) | COM(00005) | B34A |
| Group02 | VID(00006) | COM(00006) | A7B9 |
| Group02 | VID(00007) | COM(00007) | 540D |
| Group02 | VID(00008) | COM(00008) | 9D23 |

In addition, the wireless network controller 200 may be configured by connecting the visible light receiving unit 230 and the wireless network communications unit 220 as separate elements to a tablet pc or a smart phone using a USB. The tablet pc or smart phone may include a controller (control unit) 210, a commissioning application 215, and a storage unit 240.

In addition, the wireless network controller 200 of FIG. 3 may further include a commissioning application 215 for outputting information to a user or inputting information from the user in setting a group or performing commissioning. The commissioning application 215 is executed under the control of the controller (control unit) 210 and works as an interface with the user.

Figure 4:
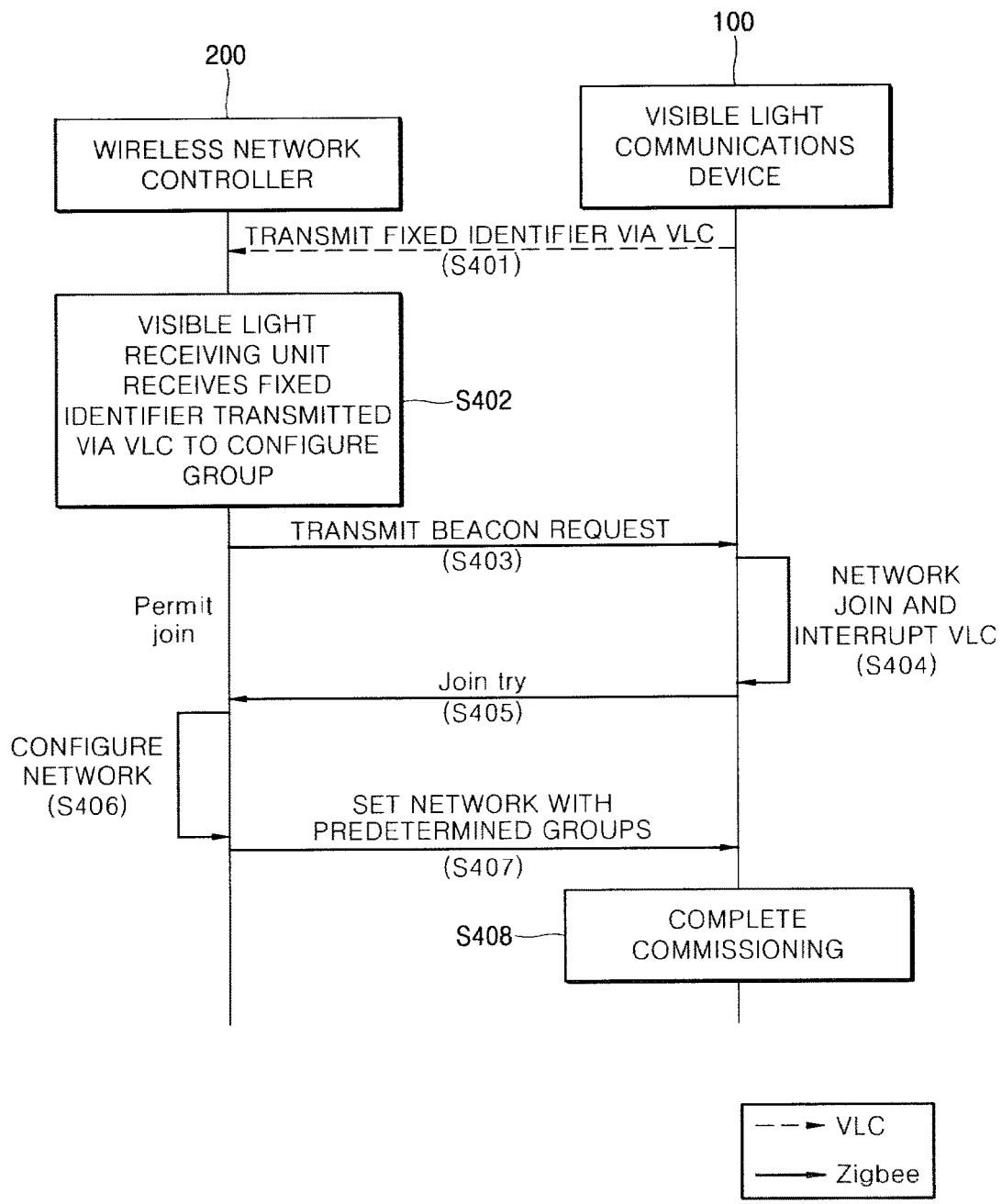
FIG. 4 is a flowchart for illustrating a process of connecting a visible light communication device to a network according to an exemplary embodiment of the present disclosure.

FIG. 4 is a flowchart for illustrating a process of connecting a visible light communications device to a network according to an exemplary embodiment of the present disclosure. The visible light communications device 100 transmits a fixed identifier using the visible light communications (VLC) (step S401). The fixed identifier may be a MAC address, for example. The exemplary embodiment shown in FIG. 4 uses the Zigbee protocol as an example of the wireless network.

The visible light communications device 100 transmits the fixed identifier through the VLC (step S401). The visible light receiving unit 230 of the wireless network controller 200 receives the fixed identifier transmitted via the VLC and forms a group (step S402). After configuring the group using the fixed identifiers of one or more visible light communications devices 100, the wireless network controller 200 performs a network join process (Permit join) so that the visible light communications devices 100 can connect to the wireless network. As a first step of the process, a beacon request message (Beacon Request) is transmitted (step S403). After receiving the beacon request message, the wireless network communications unit 120 of the visible light communications device 100 joins the network, and the controller (control unit) 110 of the visible light communications device 100 interrupts the transmission of the fixed identifier using the VLC (step S404). Alternatively, the transmission of the fixed identifier may be changed in step S404. For example, the transmission interval of the fixed identifiers may be extended. Then, a network join procedure (Join try) is carried out (step S405). In step S405, the wireless network communications unit 120 of the visible light communications device 100 transmits a fixed identifier. The controller (control unit) 210 of the wireless network controller 200 compares the fixed identifier stored in the storage unit 240 with the fixed identifier to identify the group, and configures a network (step S406). Then, the controller (control unit) 210 sets the network so that each visible light communications device 100 belongs to a predetermined group (step S407). The commissioning is completed according to the above-described procedure (step S408). The visible light communications device 100 is connected to a Zigbee wireless network to perform communications.

Referring to FIG. 4, upon receiving a message indicating that it is connected to the wireless network (Association Response) from the wireless network controller 200, the visible light communications device 100 changes its status to a network connection status (Network Up). Then, the visible light transmitting unit 130 no longer transmits the fixed identifier via the VLC data. Alternatively, the visible light communications device 100 may change the transmission interval of the fixed identifiers.

Alternatively, the visible light communications device 100 may transmit other information than the fixed identifiers. Since it is connected to the wireless network, the status information of the visible light communications device 100 may be transmitted using the VLC protocol instead of transmitting the fixed identifier. When the visible light communications device 100 is a luminaire, the state information may include the condition, location or power consumption of the luminaire. This includes an embodiment in which the state information of the visible light communications device 100 such as a luminaire can be checked using the VLC protocol after pairing.

On the other hand, when the visible light communications device 100 is disconnected from the wireless network, for example, when receiving a message indicating the disconnection (Network Leave) from the wireless network controller, the first fixed identifier may be transmitted via the VLC data again.

In summary, in the example where the visible light communications device 100 is a luminaire, the operation cycle may be divided into a VLC transmission period for transmitting the fixed identifier via the VLC and a dimming period for dimming by PWM, until the visible light communications device 100 is connected to the wireless network. After the visible light communications device 100 is connected to the wireless network, only the dimming period may be present, the type of data to be transmitted (transmission of status information) via the VLC may be changed, or the VLC transmission interval may become intermittent.

Thereafter, if the visible light communications device 100 is disconnected from the wireless network, it may operate according to the operation cycle divided into the VLC transmission period and the dimming period.

According to the procedure illustrated in FIG. 4, the commissioning process for connecting the node devices to the wireless network can be easily performed, i.e., easy commissioning is possible. That is, the position and identification information of the visible light communications device 100 such as a luminaire can be obtained via the VLC. In addition, based on this, the wireless network controller 200 may acquire the illumination information in the group. In addition, the wireless network controller 200 may set the group prior to ZigBee pairing. The wireless network controller 200 performs grouping so that it automatically control the visible light communications devices 100 after performing the ZigBee pairing with each of the visible light communications devices 100 using a commissioning tool installed in the wireless network controller 200. Although FIG. 4 has been described with reference to ZigBee, it can be applied to various wireless communications such as Bluetooth, WiFi, and UWB.

The process of connecting the visible light communications device to the wireless network may be divided into a project planning process and a commissioning process. For the project planning process, communications are performed based on visible light communications. For the commissioning process, communications are performed based on wireless communications such as Zigbee, Bluetooth, WiFi, and UWB. In FIG. 4, steps S401 and S402 belong to the project planning process, while steps S403 to S408 belong to the commissioning process.

The information transmitted/received in each process will be described in detail below.

Figure 5:
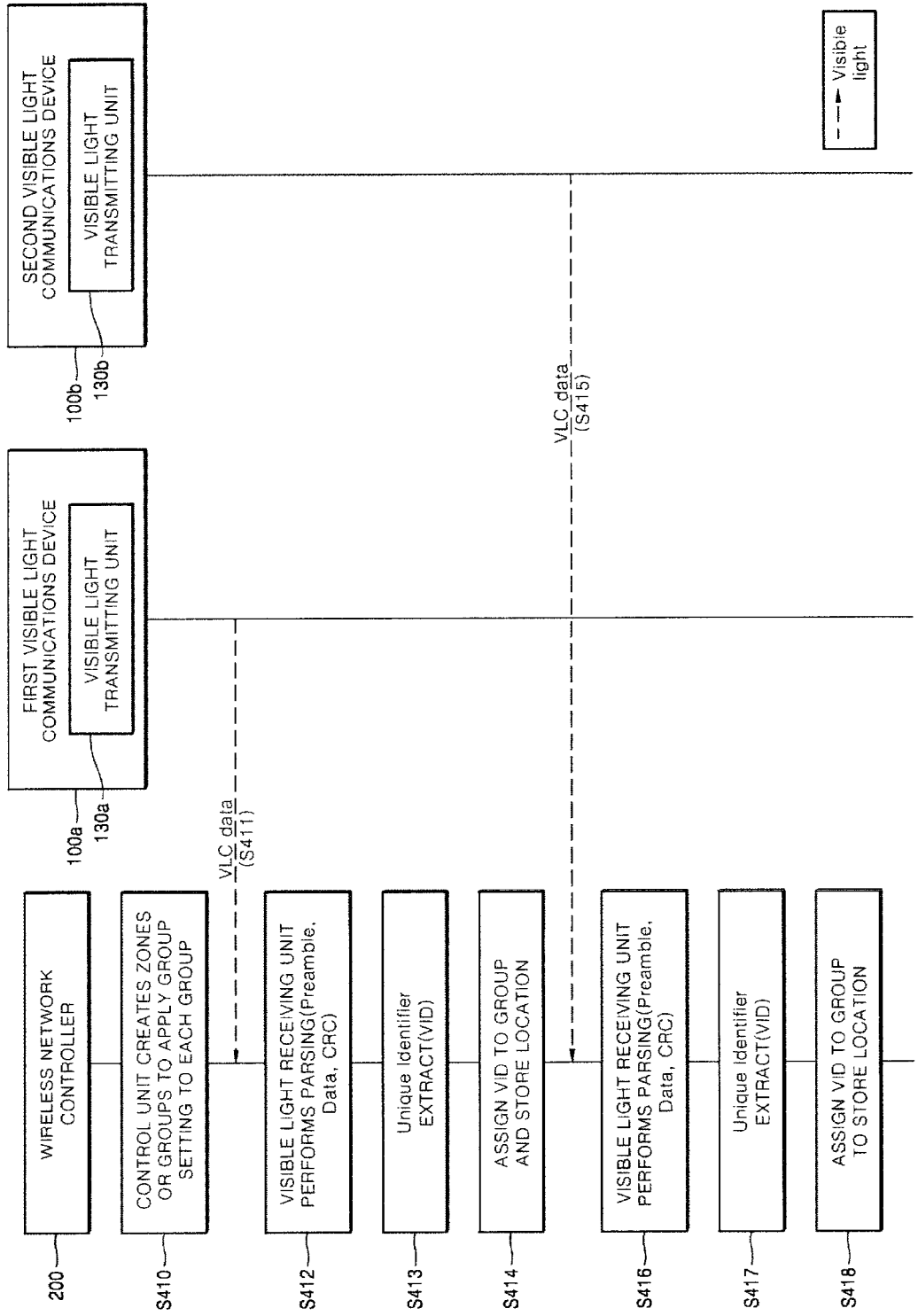
FIG. 5 is a flowchart for illustrating a project planning process according to an exemplary embodiment of the present disclosure.

FIG. 5 is a flowchart for illustrating a project planning process according to an exemplary embodiment of the present disclosure.

The controller (control unit) 210 of the wireless network controller 200 creates zones or groups and applies group setting to be applied to each of the groups. The group setting may be the name of the group, information necessary for controlling the visible light communications devices belonging to the group, and the like. The zones and groups may be created in a variety of ways depending on the implementations. For example, a zone corresponding to a physical space may correspond to one group or may be divided into two or more groups. Alternatively, two or more zones may be included in one group. That is, zones and groups may have a relationship of N: M, where N and M are natural numbers.

VLC data is received from the first visible light communications device 100a (step S411). More specifically, the visible light transmitting unit 130a transmits VLC data, and the wireless network controller 200 receives the VLC data.

As used herein, the VLC data refers to data received based on VLC communications. For example, the size of VLC data may be 10 bytes. The VLC data may be composed of a preamble, fixed identifier data, and a cyclic redundancy check (CRC). The fixed identifier data may be a MAC address. The fixed identifier does not necessarily include permanently fixed identifiers but also includes any identifier whose value does not change for a certain period of time unless it is set or operated externally.

After the visible light receiving unit 230 receives the VLC data, the controller (control unit) 210 of the wireless network controller 200 proceeds to parsing (step S412) and extracts a unique identifier which is meaningful data i.e., fixed identifier data, from the VLC data (step S413). The extracted data, i.e., the unique identifier is the sole identifier VID and can identify the first visible light communications device 100a. The VID is assigned to a specific group using a commissioning application 215 of the wireless network controller 200, and the location of a first visible light communications device 100a is stored (step S414). The second visible light communications device 100b and the wireless network controller 200 also perform steps S415 to S418 similarly to the first visible light communications device 100a.

The size of VLC data transmitted in steps S411 and S415 may be, but is not limited to, 10 bytes including the fixed identifier of 8 bytes.

Figure 6:
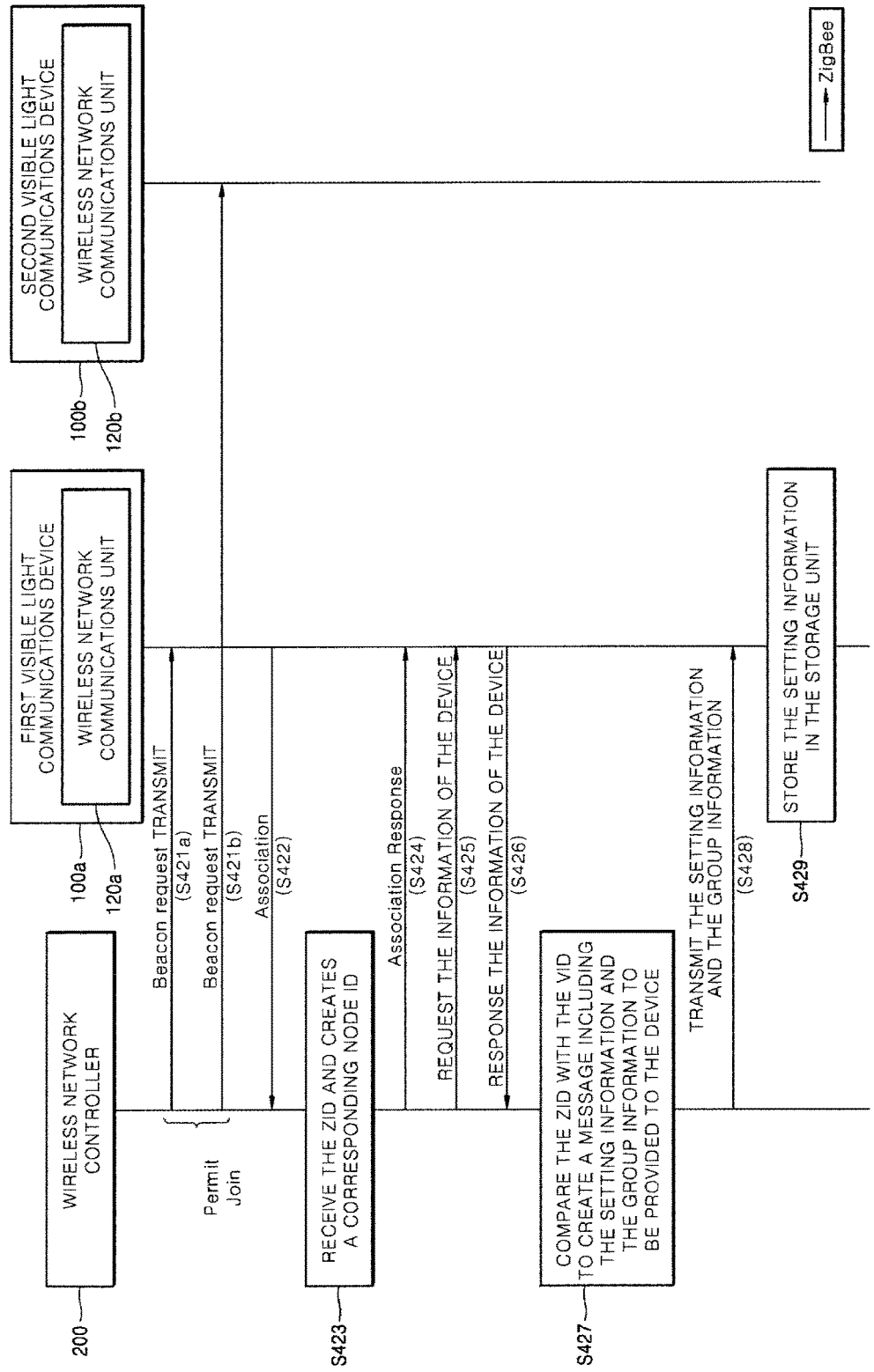
FIG. 6 is a flowchart for illustrating a commissioning process according to another exemplary embodiment of the present disclosure.

FIG. 6 is a flowchart for illustrating a commissioning process according to another exemplary embodiment of the present disclosure.

The wireless network controller 200 transmits beacon requests (steps S421a and S421b). The wireless network controller 200 may broadcast the beacon requests. This may be referred to as Permit Join process, in which the wireless network controller 200 requests to connect to the wireless network it controls or coordinates. The first visible light communications device 100a among the visible light communications devices that have received the beacon request will be mainly described.

The first visible light communications device 100a transmits a message to request connection (Association) (step S422). This may include the 8-byte MAC address (ZID) used in ZigBee communications. This is identical to the VID transmitted in the project planning process of FIG. 5. The wireless network controller 200 receives the ZID and creates a corresponding node ID (step S423). The node ID refers to an identifier used in a ZigBee network. In step S423, the wireless network controller 200 may determine whether the ZID is identical to the VID received in the process of FIG. 5. If so, the wireless network controller 200 may identify the group information set in the VID to determine which group the visible light communications device having transmitted the ZID belongs to.

The wireless network controller 200 transmits the created node ID (2 bytes in the case of ZigBee) by including it in a message in response to the connection (Association Response) (step S424).

Subsequently, the wireless network controller 200 transmits a message to request the information of the device (step S425). The message may be composed of an end point and a cluster ID. After receiving the message, the wireless network communications unit 120a of the first visible light communications device 100a responds to the request (step S426). After receiving the device information, the wireless network controller 200 compares the ZID with the VID to create a message including the setting information and the group information to be provided to the device (step S427)

and transmits the created message (step S428). After receiving the message, the first visible light communications device 100a stores the setting information in the storage unit 150a (step S429). Thereafter, the first visible light communications device 100a and the wireless network controller 200 communicate with each other using Zigbee protocol until it is disconnected from the wireless network. Meanwhile, the first visible light communications device 100a stops outputting the fixed identifier via visible light.

The second visible light communications device 100b also performs the steps S422 to step S429.

In step S424, the first visible light communications device 100a having received the Association Response may change its status to the Network Up. Then, the visible light transmitting unit 130 no longer transmits the fixed identifier via the VLC data. Alternatively, the visible light communications device 100 may change the transmission interval of the fixed identifiers.

Alternatively, the first visible light communications device 100a may transmit other information than the fixed identifier. Since it is connected to the wireless network, the status information of the visible light communications device 100 may be transmitted using the VLC protocol instead of transmitting the fixed identifier. When the visible light communications device 100 is a luminaire, the state information may include the condition, location or power consumption of the luminaire.

On the other hand, when the first visible light communications device 100a is disconnected from the wireless network, for example, when receiving a message indicating the disconnection (Network Leave) from the wireless network controller, the first fixed identifier may be transmitted via the VLC data again.

Figure 7:
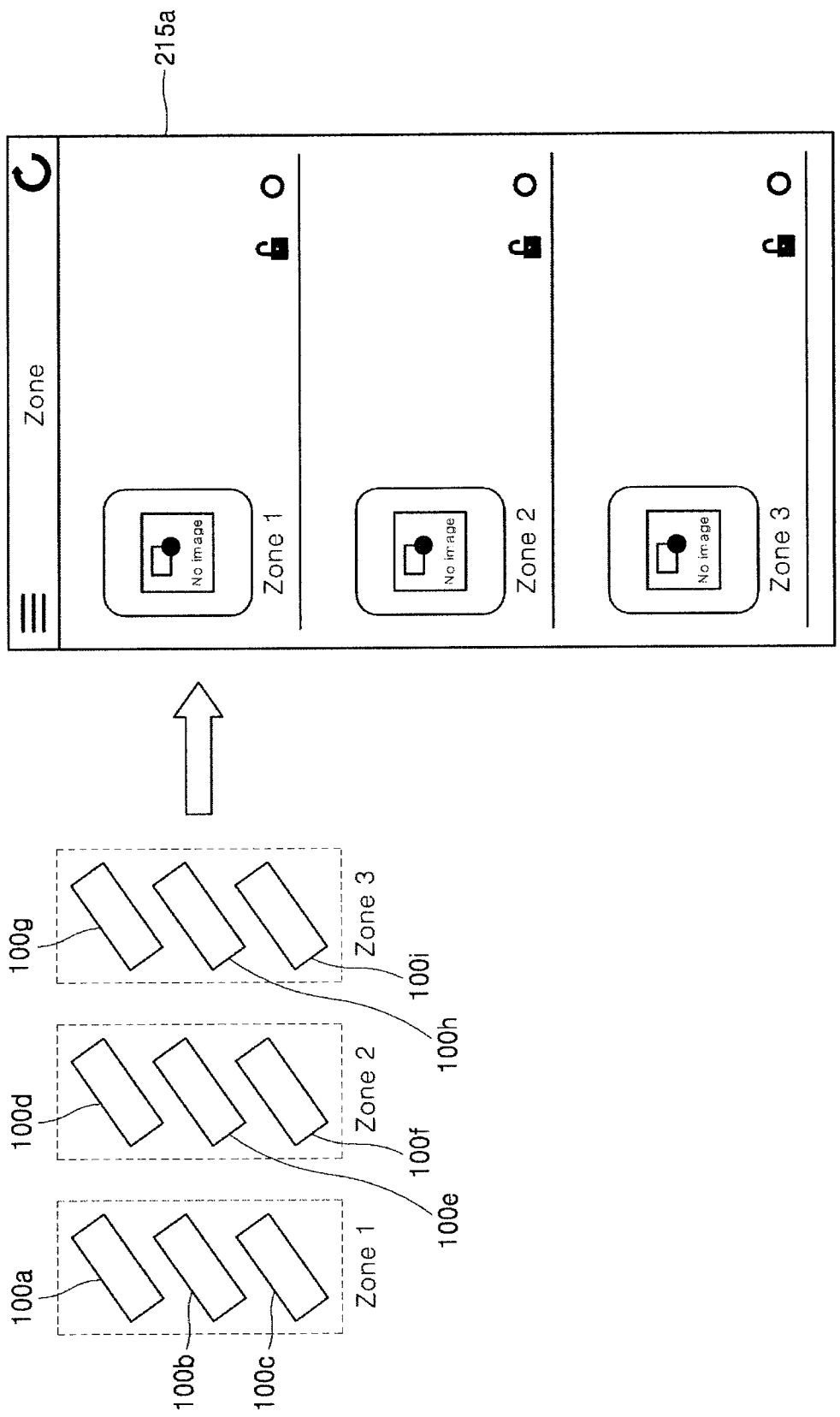
FIGS. 7 to 11 are diagrams illustrating an operation process by a commissioning application according to an exemplary embodiment of the present disclosure.

FIGS. 7 to 11 are diagrams illustrating an operation process by a commissioning application according to an exemplary embodiment of the present disclosure. The commissioning application may preset groups of a plurality of visible light communications devices or output the predetermined groups on the screen. For example, in FIG. 7, zones each corresponding to the respective floors, sections, or the like may be set. It can be seen that from FIG. 7 that three zones 1 to 3 are set, and three luminaires in each of the zones are disposed and thus nine luminaires 100a to 100i are disposed in total. Information about each zone is displayed in the commissioning application 215a. The commissioning application 215a shows that three zones have been registered. The zones may be set by the user depending on the physical sections or floors and may be variously selected depending on the coverage. For example, there may be a zone-group hierarchical structure in which a zone is configured for every floor and a group is set for every section, or a group-zone hierarchical structure in which a plurality of zones is set as one group, for example. In FIG. 7, it is assumed that the zones and the groups have the relationship of 1:1, and the visible light communication devices disposed in a zone belong to one group.

Figure 8:
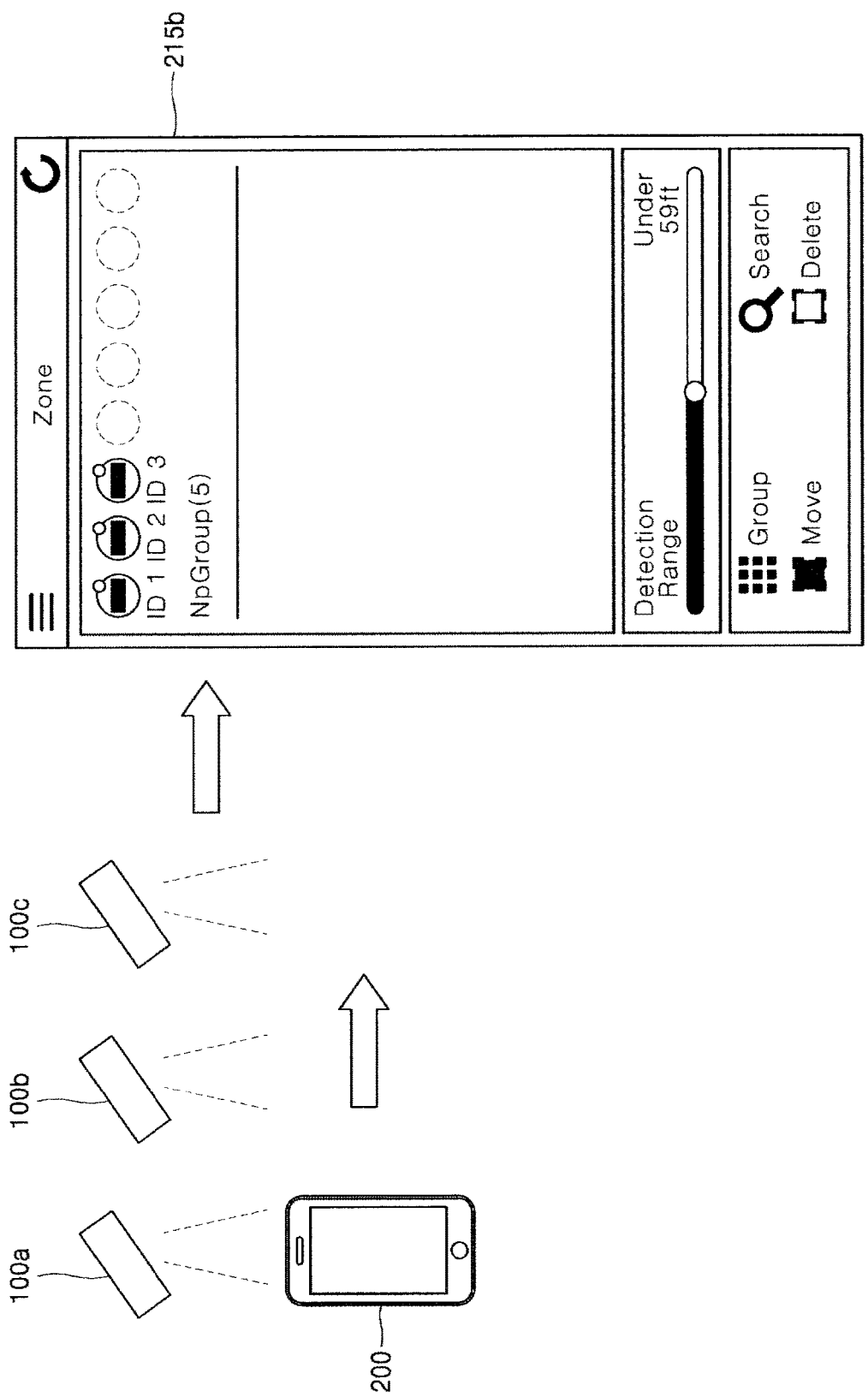

FIG. 8 shows a process in which the wireless network controller 200 receives the fixed identifiers from the plurality of visible light communications devices 100a to 100c while moving within one zone. The commissioning application 215b shows that the fixed identifiers (e.g., MAC addresses) of the three visible light communications devices 100a to 100c indicated by ID1 to ID3, respectively, are stored in the storage unit 240 of the wireless network controller 200 after moving. Each of the icons represents their respective visible light communications devices, and their fixed identifiers are displayed below them. By using the process shown in FIG. 8, the wireless network controller 200 can acquire fixed identifiers of a plurality of visible light communications devices arranged in a specific range. In doing so, the fixed identifiers of the visible light communications devices may be included in a specific group. Alternatively, the wireless network controller 200 may collect the fixed identifiers of the visible light communications devices in advance and then assign them to a specific group.

Referring to FIG. 8, the commissioning application receives a plurality of first fixed identifiers from a plurality of visible light communications devices, respectively, to display them, and creates a group of the displayed first fixed identifiers and store them.

Figure 9:
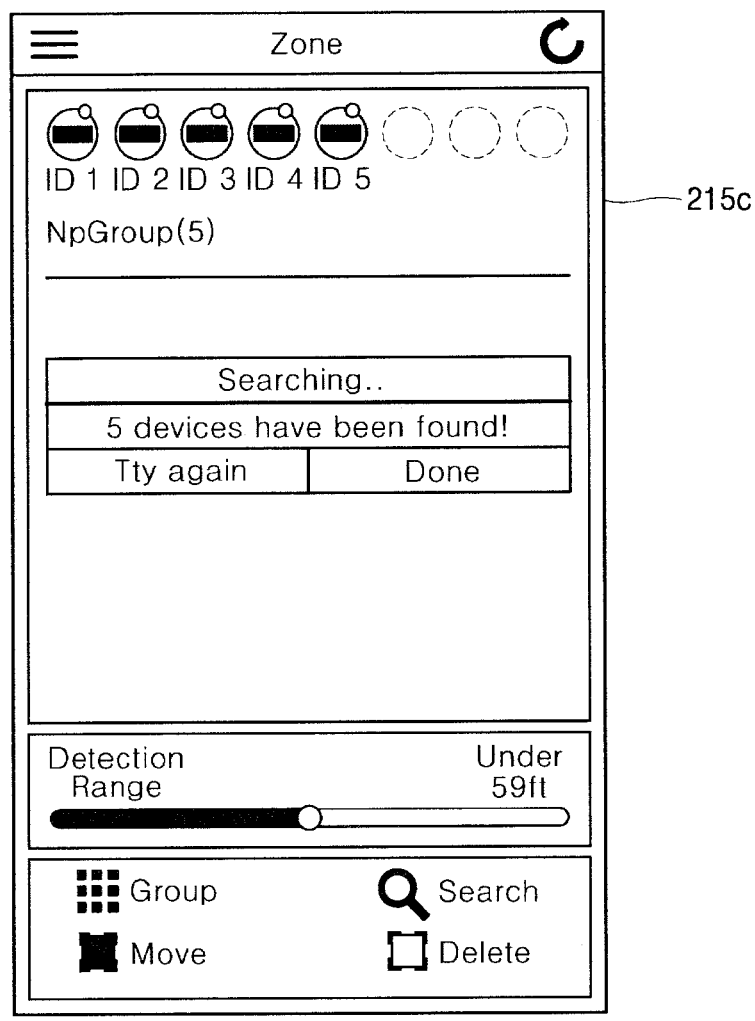

FIG. 9 is a diagram illustrating a process of searching fixed identifiers of visible light communications devices using voltage communications by a wireless network device according to an exemplary embodiment of the present disclosure. For example, in the process of arranging or moving the visible light communications devices, three visible light communications devices have been found as in the example shown in FIG. 8. When more visible light communications devices are arranged in the zone, the searching process of receiving fixed identifiers transmitted by visible light communications devices is continuously performed by touching a Search button at the lower portion of the screen of the commissioning application 215c. As a result, more fixed identifiers of the visible light communications devices than those of FIG. 8 are listed up.

In addition, an additional group may be set by selecting some from among the listed-up visible light communications devices.

Figure 10:
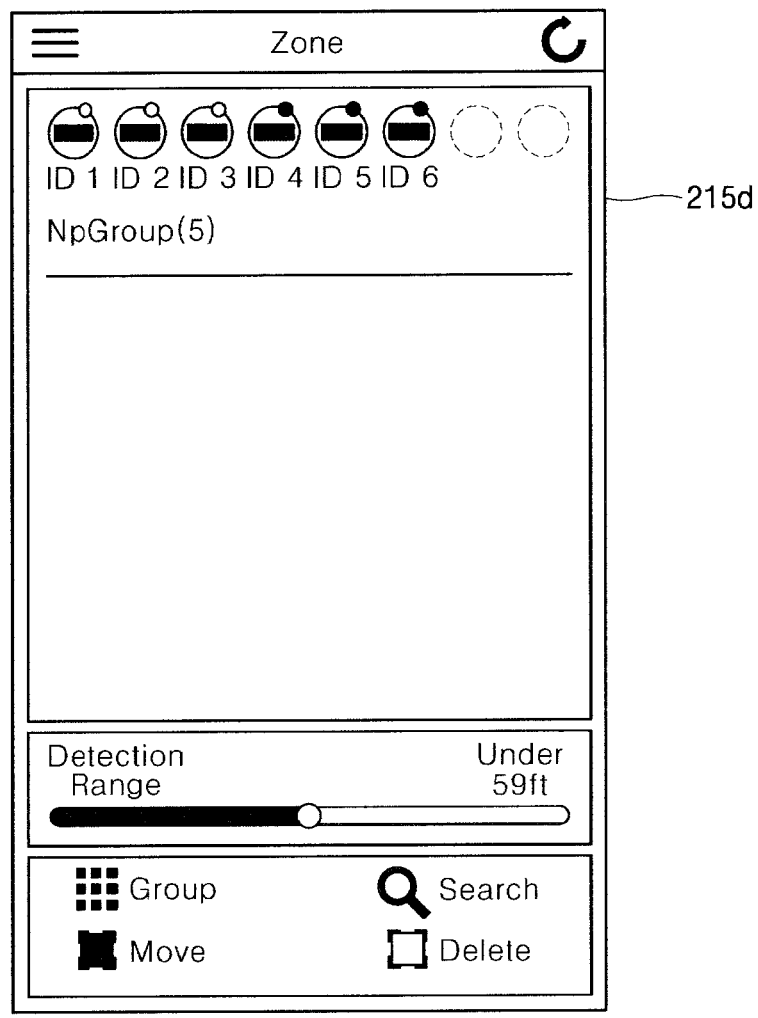
Figure 11:
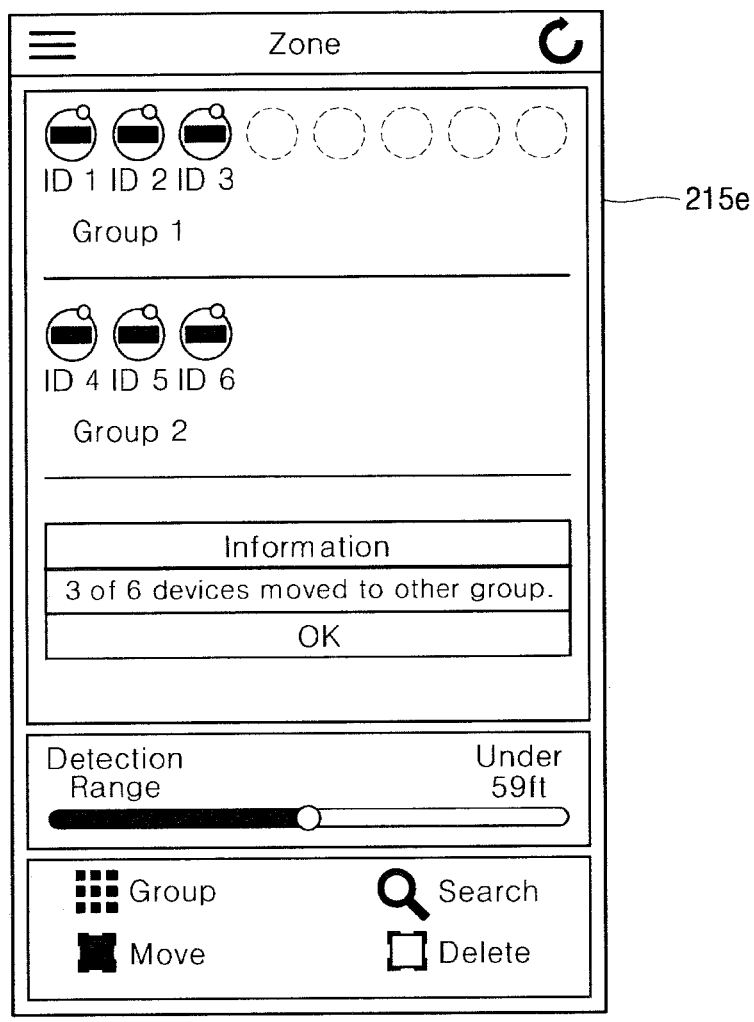

FIGS. 10 to 11 are diagrams showing a process of moving visible light communications devices identified in the commissioning application to another group.

As indicated by the commissioning application 215d of FIG. 10, the user selects three icons from among the icons of some visible light communications devices and touches a Move button at the lower portion. The commissioning application shown 215e in FIG. 11 shows that the icons of the three selected visible light communications devices has been moved. The movement of the visible light communications devices of FIGS. 10 and 11 may also be applied to a process of communicating with a wireless network such as ZigBee after commissioning is completed. In addition, in the process of selecting a particular visible light communications device, it is possible to control the functional unit of the visible light communications device to operate using wireless network communications such as ZigBee. For example where the visible light communications device is a luminaire, it is possible to control the visible light communications device so that it blink using Zigbee communications, to identify the selected visible light communications device.

According to the above-described embodiment, the commissioning application may set a group in advance and receive first fixed identifiers from the visible light communications devices that are supposed to belong to the group, and display the first fixed identifiers in the group for checking.

The commissioning application may set a group of a plurality of visible light communications devices and output them on the screen. In addition, the commissioning application may display an icon representing the visible light communications device corresponding to the received fixed identifier, and control the icons to create a group or move.

Figure 12:
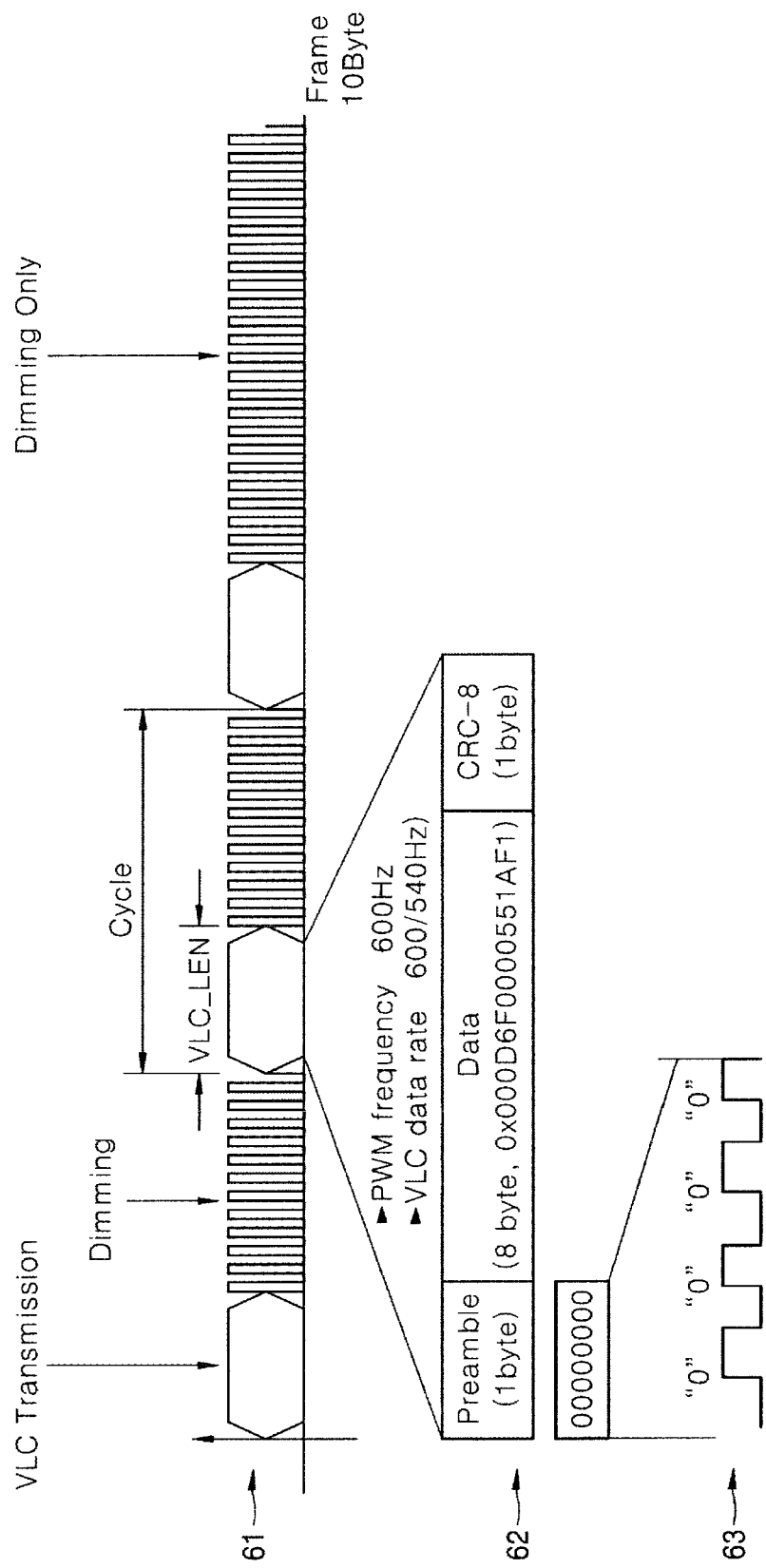
FIGS. 12 and 13 are diagrams showing a data structure of a fixed identifier that is output by a visible light communications device according to an exemplary embodiment of the present disclosure based on visible light communications.
Figure 13:
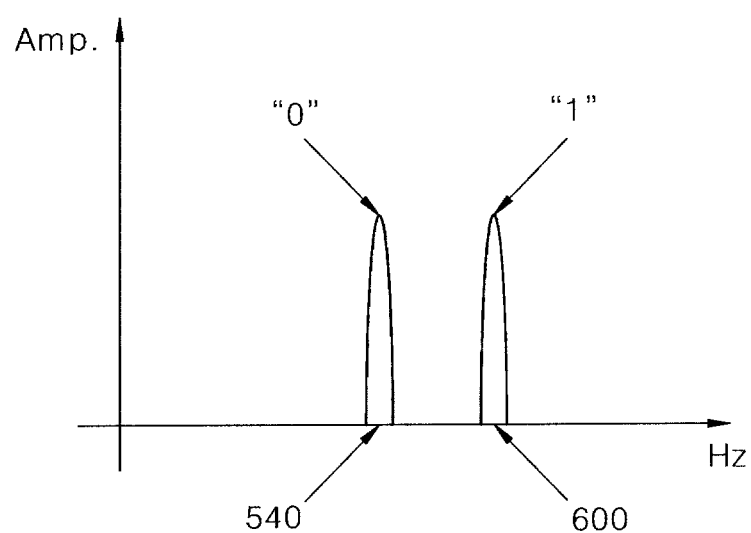

FIGS. 12 and 13 are diagrams showing a data structure of a fixed identifier that is output by a visible light communications device according to an exemplary embodiment of the present disclosure based on visible light communications. FIG. 12 will be described first. In this exemplary embodiment, the visible light communications device is a luminaire. A period of illumination 61 by the visible light communications device is shown. More specifically, the period is divided into a VLC transmission period for outputting a fixed identifier (VLC Transmission) and a dimming period for controlling dimming by PWM (pulse-width modulation). The visible light communications device outputs data containing a fixed identifier in the VLC transmission period and may include the dimming period only if a predetermined condition is met. For example, when a wireless network communications unit of a visible light communications device is connected to a wireless network, only dimming may be performed without a VLC transmission period. In the period 61, there is no VLC transmission from the time point indicated as Dimming Only. Thereafter, when the visible light communications device is disconnected from the wireless network, the VLC transmission may be performed again.

The VLC transmission period and the dimming period may be one cycle. The length of the VLC transmission period VLC_LEN may vary depending on the contents of data to be transmitted using the VLC. The configuration of the transmission frame 62 of the VLC will be described. When the fixed identifier is a 8-byte ZigBee MAC address, the total of 10 bytes may be transmitted via the VLC, with 1 byte for a preamble, 8 bytes for data to be actually transmitted, and 1 byte for CRC check. The preamble 63 may transmit predetermined information as a signal for indicating the start of data, such as "0000" shown in FIG. 12.

This may vary depending on policy. The predetermined information may be included in the preamble so that the wireless network controller 200 can know that the VLC transmission is started. 8 bytes may be allocated for the data area, and 1 byte may be allocated for the CRC area (CRC-8) for detecting the error of the data.

Incidentally, when 0s and 1s represented in the VLC transmission period are divided with frequency spectrum, the overall size of the VLC, i.e., 10 bytes composed of 0s and 1s may be variable. That is, frequency shift keying modulation (FSKM), which is a frequency shift keying scheme, may be used to distinguish between 0s and 1s. In this case, for example, as shown in FIGS. 13, 0 and 1 may be distinguished from each other by frequency with the same amplitude. Specifically, when 0 is represented by 540 Hz and 1 by 600 Hz, the overall size (10 bytes) of the VLC data may become minimum 83.33 ms to maximum 92.59 ms depending on the numbers of 0 and 1 included in 10-byte VLC data. That is, the length of the VLC_LEN in FIG. 12 may be variable, and the length of the VLC transmission period may differ from different visible light communications devices.

The length of the VLC transmission period is variable, and the length of the cycle may be constant, for example, 250 ms. The dimming period may be controlled by adjusting the brightness of the luminaire.

The length of the VLC transmission period may be varied by the FSK modulation scheme, such that the VLC transmission period may be determined at random. For example, when a fixed identifier is converted into VLC data by setting 0 as the first frequency and 1 as the second frequency, the length of the VLC data may vary depending on the numbers of 0s and 1s included in the fixed identifier. As a result, since the length of the VLC transmission period varies depending on the fixed identifier of the visible light communication device, the VLC transmission period can be set randomly. For example, since the lengths of the fixed identifiers of the three visible light communication devices in the same space are different from one another, even if there is a collision among the VLC data, they may not collide after a certain period of time.

In addition, by setting the VLC transmission period randomly, which will be described with reference to FIG. 16, it is possible to prevent collision of the VLC transmission periods among the visible light communication devices, to eliminate signal interference.

In addition, it is possible to reduce the possibility of collision of the VLC transmission periods among the plurality of visible light communications devices by extending the interval at which the visible light communications device connected to the wireless network transmits the fixed identifier. The extending the interval refers to elongating the time difference between the original VLC transmission intervals. Alternatively, the extending the interval refers to elongating the dimming period so that the VLC transmission periods are intermittently arranged.

Figure 14:
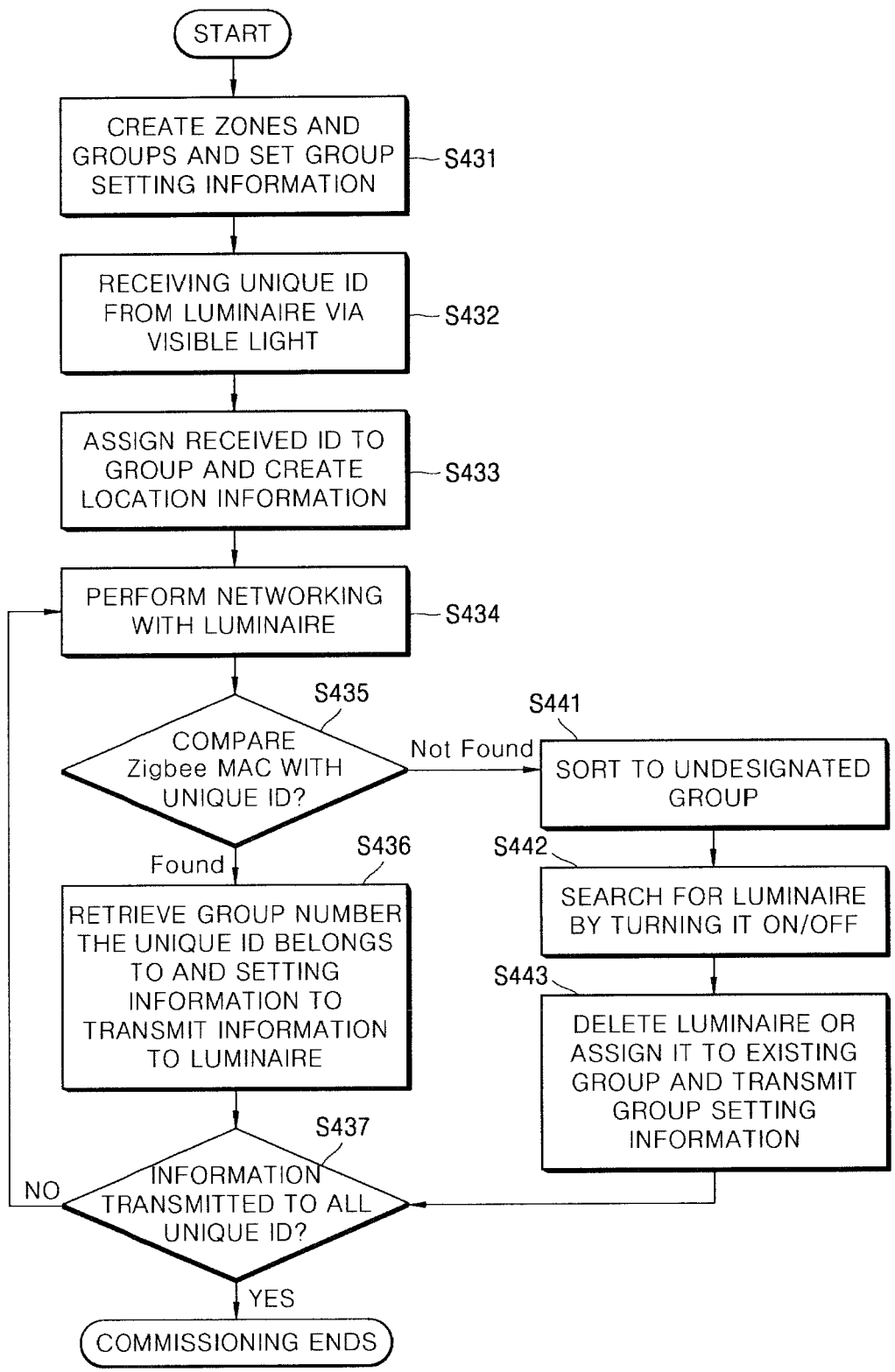
FIG. 14 is a flowchart for illustrating a process in which a wireless network communications device according to an exemplary embodiment of the present disclosure identifies visible light communications devices and controls the visible light communications devices so that they connect to the wireless network.

FIG. 14 is a flowchart for illustrating a process in which a wireless network communications device according to an exemplary embodiment of the present disclosure identifies visible light communications devices and controls the visible light communications devices so that they connect to the wireless network. The above descriptions with respect to FIGS. 5 and 6 are also included. In the following description, the visible light communications device is a luminaire and the wireless network communications is a Zigbee communications.

Zone and groups are created using the commissioning application 215 of the wireless network controller 200, and group setting information is set (step S431). For example, a zone may be created for each floor, and groups may be created for each zone. Alternatively, a zone may be created for each floor/office, and a group including a plurality of zones may be created. Then, a unique ID (VID), which is a fixed identifier of the visible light communications device, i.e., a luminaire, is received by using the visible light receiving unit 230 of the wireless network controller 200 (step S432). The received ID is assigned to the group using the commissioning application 215 and position information is created (step S433).

When it is determined that the unique IDs of the visible light communications devices, i.e., the luminaires, disposed in the physical area are received on the commissioning application 215, the wireless network communications unit 220 performing communications using ZigBee performs networking with the visible light communications devices (step S434). For example, after the wireless network communications unit 220 transmits a join message, when each of the visible light communications devices (luminaires) transmits a ZigBee MAC address, the wireless network communications unit 220 receives the addresses to compare them with the unique IDs assigned and stored in step S433 (step S435). If the unique ID is found as a result of the comparison (Found), the number of the group the unique ID belongs to (group identification information) and the setting information are retrieved and transmitted to the luminaire (step S436). The information is transmitted by the wireless network communications unit 220 using ZigBee. In addition, upon receiving the information, the luminaire checks that it is connected to the wireless network and interrupts the output of the fixed identifier using visible light to maintain the dimming period shown in FIG. 12.

The commissioning application 215 may repeat steps S434 to S437 to check if information has been transmitted to the luminaires of all unique IDs, and if so, commissioning is completed.

On the other hand, if no unique ID is not found as a result of the comparison in step S435 (Not Found), the received ZigBee MAC address is classified into the undesignated group and connected to the wireless network. Thereafter, using the commissioning application 215, the luminaire classified into the undesignated group is turned on/off to search for luminaire (step S442). The illumination is set to a separate group or a new group, and the group setting information is transmitted to the wireless network communications unit 120 of the luminaire (step S443). Subsequently, it proceeds to step S437.

FIG. 15 is a flowchart for illustrating an operation process by a visible light communications device according to an exemplary embodiment of the present disclosure.

When power is applied to the visible light communications device (step S451), the controller (control unit) checks if the wireless network communications unit 120 is connected to a wireless network (step S452). If the wireless network communications unit 120 is connected to the wireless network (step S453), the process ends without additionally controlling the visible light transmitting unit. On the other hand, if the wireless network communications unit 120 is not connected to the wireless network, the visible light transmitting unit 130 transmits the fixed identifier via the VLC during the VLC transmission period (step S454). Only the VLC transmission period is transmitted. When the visible light communications device 100 is a luminaire, there are the VLC transmission period and the dimming period, such that no VLC communications in the dimming period and only dimming function is provided.

Then, it is determined whether the wireless network communications unit has received the join message (step S455). More specifically, as shown in FIG. 6, the wireless network communications unit 120 of the visible light communications device receives a first message requesting a join from the wireless network controller controlling the first wireless network. For example, the first message includes a beacon request message. Upon receiving the first message, the wireless network communications unit 120 of the visible light communications device transmits a fixed identifier to the wireless network controller (step S457).

In doing so, the controller (control unit) 110 may interrupt the VLC communications by the visible light transmitting unit 130 (step S456). According to another exemplary embodiment, when it is determined that it is connected to the wireless network after one of steps S457, S458 and S459, the controller 110 may interrupt the VLC communications by the visible light transmitting unit 130 or change the VLC data transmission cycle. That is, if it is determined that the visible light communications device 100 is connected to the wireless network and it is no longer necessary to output the fixed identifier via the visible light communications, the controller (control unit) 110 controls the visible light transmitting unit 130 so that it does not transmit the fixed identifier. Alternatively, when the visible light communications device 100 is connected to the wireless network, the controller (control unit) 110 may change the transmission cycle of the fixed identifier. For example, the transmission cycle of the fixed identifier, that is, the VLC data, may be different cycles such as every 10 minutes, every 30 minutes, every 1 hour or every 24 hours.

For example, as shown in FIG. 12, the ratio of the length of the VLC transmission period to the length of the dimming period before the device is connected to the wireless network is referred to as A. The ratio of the length of the VLC transmission period to the length of the dimming period after the device is connected to the wireless network is referred to as B. Then, the relationship A>B>=0 can be established.

In other words, the VLC transmission periods are densely arranged before the device is connected to the wireless network, so that the wireless network controller can easily receive the VLC data. On the other hand, after the device is connected to the wireless network, the VLC transmission periods are sparsely arranged, such that the visible light communications device intermittently transmits the VLC data. Alternatively, the VLC transmission is interrupted, and the visible light communications device may transmit the VLC data again after the device is disconnected from the wireless network. Alternatively, after the device is disconnected from the wireless network, the visible light communications device may change the VLC data transmission cycle (or the fixed identifier transmission cycle) of the visible light communications device shorter.

After step S457, the visible light communications device receives the setting information based on the wireless network (step S458) and receives the control information (step S459). Depending on the setting information, the device may operate individually or may operate as a group if the device belongs to the particular group.

Even after the device has been connected to the wireless network, the controller (control unit) may control the visible light transmitting unit 130 so that it transmits the fixed identifier until the connection with a new wireless network is established when the connection with the wireless network is released.

In order to avoid collision with adjacent visible light communications devices in transmitting the VLC data, the visible light communications device may randomly select the VLC transmission period. For example, a VLC transmission period may be set at the beginning of a cycle. Alternatively, a VLC transmission period may be set at a middle or after a cycle.

Summarizing the above description with respect to FIG. 15, the visible light communications device may operate in the dual mode consisting of a mode for transmitting a fixed identifier via visible light and a mode for connecting to and communicating with the wireless network.

FIG. 16 is a diagram for illustrating a process of setting a VLC transmission period at random by a plurality of visible light communications devices according to an exemplary embodiment of the present disclosure. In the following description, the visible light communications device is a luminaire.

The controller (control unit) 110 may differently dispose the period in which the visible light transmitting unit 130 transmits the VLC and the dimming period within a cycle. In an exemplary embodiment, for the first visible light communication device, as indicated by 65, the VLC transmission periods are consistently located at the beginning in one cycle. On the other hand, for the second visible light communications device, as indicated by 66, the VLC transmission periods may be located randomly within one cycle under the control of the controller.

In particular, the start point of each cycle may vary as shown in FIG. 16 when the power is not applied to them simultaneously or due to a difference in processing time between the visible light communications devices. Therefore, the modulation time point in which VLC data is included in visible light communications can be different from different visible light communications devices, and thus packet collision due to visible light interference can be prevented. In addition, a certain visible light communications device or all visible light communications devices may set the VLC transmission period randomly. For example, the data modulation timing of the unique identifiers may be randomly generated for each of the luminaires, so that the visible light receiving unit 230 of the wireless network controller can filter the noise mixed signal and can receive the VLC data (visible light data) without interference of the ambient light.

In this configuration, when the second visible light communications device randomly sets the VLC transmission periods, it may not overlap the VLC transmission periods of the adjacent first visible light communications device at a certain time point (Cycle 2). As a result, when the visible light communications devices are powered at different timings, by setting the VLC transmission periods randomly, the fixed identifiers transmitted via the VLC among the adjacent visible light communications devices can be received more accurately.

This can be summarized as follows: For a visible light communications device such as a luminaire, the visible light transmitting unit may be integrally coupled with the luminaire. For example, the emitting unit of the luminaire (for example, an LED) may be integrally coupled with the visible light transmitting unit. In this case, as shown in FIG. 12, the controller 110 can divide the operation of the visible light transmitting unit cycle by cycle, and can control the visible light transmitting unit so that it transmits the fixed identifier in the VLC transmission period during the cycle.

The cycle may be divided into the VLC transmission period and the dimming period when the wireless network communications unit 120 of the visible light communications device is not connected to a wireless network, while the cycle includes the dimming period only when it is connected to the wireless network, as described above with respect to FIG. 12.

In FIG. 16, it has been described that the controller (control unit) 110 randomly sets positions of the VLC transmission periods in a cycle to avoid collision of the identifier transmission with another adjacent visible light communication device.

In order to avoid packet collision during transmission of a fixed identifier using visible light of a plurality of visible light communication devices, the following configuration is provided herein. First, by employing frequency modulation scheme for modulating 0s and 1s, 10-byte data to be transmitted as VLC data has various lengths depending on the arrangement of 0s and 1s. By doing so, VLC data can be transmitted randomly.

Subsequently, the visible light communications devices can transmit the fixed identifiers after the controller (control unit) 110 is booted after the power is applied, and the booting time points of the respective controllers (control units) of the visible light communication devices may be different, so that conflicts can be avoided in the process of transmitting the fixed identifiers.

In addition, the visible light communications devices can randomly arrange the VLC transmission periods for transmitting the fixed identifier and the dimming periods so as to avoid overlapping of the VLC transmission periods among the visible light communication devices. This avoids packet collision of VLC data.

In addition, once one of the visible light communications devices is connected to a wireless network, it interrupts the VLC transmissions, and accordingly the VLC data can be transmitted/received more accurately as the number of the visible light communications devices connected to the wireless network increases.

Previously, in order to connect devices such as a luminaire and a sensor to a network such as Zigbee or Bluetooth, it is necessary to identify each of the devices. Specifically, it is necessary to search for a luminaire disposed in a given space, to connect the luminaire to a network, and to check is the luminaire is the correct one. If there are a number of devices, there may be an error during the installation. According to exemplary embodiments of the present disclosure, visible light communications devices not connected to a wireless network transmits fixed identifiers using VLC communications, such that the network can be registered more conveniently and accurately.

According to exemplary embodiments of the present disclosure, a fixed identifier such as a MAC address necessary for network setting is received from a visible light communications device via visible light communications, such that a network can be installed in a particular space. In addition, visible light communications may be used as a previous step for providing the wireless network communications unit in the visible light communication device with the setting information for connecting the visible light communication devices to a network suitable for the installation space. Further, after the visible light communications devices are connected to the wireless network, it is possible to control to interrupt the visible light communications by the visible light communication devices. When the devices are disconnected from the wireless network, visible light communications devices can again transmit the fixed identifiers, so that information necessary for connection to the wireless network can be received accurately using visible light communications.

Moreover, according to exemplary embodiments of the present disclosure, by using a wireless network controller having mobility, visible light communications devices disposed in a large area can be sorted into groups each corresponding to a space, to control the network connection.

In addition, according to exemplary embodiments of the present disclosure, desired information (fixed identifier) can be received without interference among visible light luminaires. In addition, a unique ID of a luminaire can be received from a visible light luminaire, and location information can be set. According to exemplary embodiments of the present disclosure, no additional process of searching luminaires is required, such that the overall time can be saved by perform commissioning.

Although the features and elements are described in particular combinations in the exemplary embodiments of the present disclosure, each feature or element can be used alone or in various combinations with or without other features and elements. In addition, although each of the features and elements may be implemented as an independent hardware component, some or all of the features and elements may be selectively combined into one or more hardware components with a computer program having a program module that causes the hardware components to perform some or all of the functionality described herein. Codes and code segments of such a computer program will be easily conceivable by those skilled in the art. Such a computer program is stored on a computer-readable storage medium and may be read/executed by a computer to thereby implement the exemplary embodiments of the present disclosure. The storage medium of the computer program includes a magnetic storage medium, an optical storage medium, a semiconductor storage device, etc. Further, the computer program implementing the exemplary embodiments of the present disclosure includes a program module transmitted in real-time via an external device.

Although the exemplary embodiments of the present disclosure have been described for illustrative purposes, those skilled in the art will appreciate that various modifications, additions and substitutions are possible without departing from the scope and spirit of the present disclosure. Accordingly, it will be understood that such modifications, additions and substitutions also fall within the scope of the present disclosure.

It is an object of the present disclosure to provide a method including identifying a visible light communications device using a predetermined fixed identifier, storing the identified information, and establishing a network in a particular space.

According to an exemplary embodiment of the present disclosure, information necessary for initial setting process is transmitted/received using visible light communications so that visible light communications devices connect to a network appropriate for an installation space. After the network setting is completed, the visible light communications are changed.

According to an exemplary embodiment of the present disclosure, by using a controller device having mobility, visible light communications devices disposed in a large area can be sorted into groups each corresponding to a space, to set the network connection.

Objects of the present disclosure are not limited to the above-described objects and other objects and advantages can be appreciated by those skilled in the art from the following descriptions. Further, it will be easily appreciated that the objects and advantages of the present disclosure can be practiced by means recited in the appended claims and a combination thereof.

In accordance with one aspect of the present disclosure, a visible light communications device comprises a wireless network communications unit that performs communications by using a wireless protocol, wherein the wireless network communications unit to provide a fixed identifier, a visible light transmitting unit that transmits the fixed identifier using a visible light communications protocol, and a controller that controlling the visible light transmitting unit such that the visible light transmitting unit selectively transmits the fixed identifier using the visible light communications protocol based on whether the wireless network communications unit is connected to a first wireless network.

In accordance with another aspect of the present disclosure, a wireless network controller comprises: a wireless network communications unit performing communications using a wireless protocol; a visible light receiving unit receiving a first fixed identifier from a visible light communications device by using a visible light communications protocol; a storage storing the received first fixed identifier for a predetermined group; and a controller that controls the wireless network communications unit, the visible light receiving unit, and the storage, wherein when the wireless network communications unit transmits a first message requesting to join a first wireless network to one or more visible light communications devices and then the wireless network communications unit receives a second fixed identifier, the controller of the wireless network controller searches the storage for a first fixed identifier having the same value as the second fixed identifier, and, if the found first fixed identifier is not connected to the first wireless network, the controller controls the visible light communications device so that it connects to the first wireless network.

In accordance with another aspect of the present disclosure, a method, which is performed by a dual-mode visible light communications device operating in a visible light communications mode and a wireless network communications mode, comprises: transmitting, by a visible light transmitting unit, a fixed identifier using a visible light communications protocol based on control of a controller; receiving, by a wireless network communications unit, a message request to join a first wireless network controller; transmitting, by the wireless network communications unit, the fixed identifier to the first wireless network controller; connecting the wireless network communications unit to a first wireless network controlled by the wireless network controller; and after one of the receiving, the transmitting and the connecting, controlling, by the controller of the visible light communications device, the visible light transmitting unit so that it changes transmission of the fixed identifier using the visible light communications protocol.

In accordance with another aspect of the present disclosure, a method, which is performed by a dual-mode wireless network controller operating in a visible light communications mode and a wireless network communications mode, includes receiving, by a visible light receiving unit, one or more first fixed identifiers from one or more visible light communications devices via a visible light communications protocol; assigning the received first fixed identifiers to a group stored in the storage to store them; transmitting, by a wireless network communications unit, a first message requesting to join a first wireless network to more or more visible light communications devices to receive a second fixed identifier; and comparing, by the controller, the second fixed identifier with the first fixed identifier stored in the storage, and transmitting, by the wireless network communications unit, setting information or control information necessary for connecting to the first wireless network to the visible light communications device if the visible light communications device is not connected to the first wireless network.

According to an exemplary embodiment of the present disclosure, a visible light communications device can be connected to a new wireless network by using a predetermined fixed identifier.

According to an exemplary embodiment of the present disclosure, a controller checks the identifier transmitted from a visible light communications device via visible light communications, allowing for network connection.

Further, according to an exemplary embodiment of the present disclosure, the identification information from a visible light communications device is transmitted to a limited distance, such that the controller selectively controls network connection of only some nearby visible light communications devices, thereby increasing accuracy.

Moreover, according to an exemplary embodiment of the present disclosure, by using the controller having mobility, visible light communications devices disposed in a large area can be sorted into groups each corresponding to a space, so that the network connection is established. As a result, the efficiency of network setting can be increased.

It should be noted that effects of the present disclosure are not limited to those described above and other effects will be apparent to those skilled in the art from the following descriptions.

It will be understood that when an element or layer is referred to as being "on" another element or layer, the element or layer can be directly on another element or layer or intervening elements or layers. In contrast, when an element is referred to as being "directly on" another element or layer, there are no intervening elements or layers present. As used herein, the term "and/or" includes any and all combinations of one or more of the associated listed items.

It will be understood that, although the terms first, second, third, etc., may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section could be termed a second element, component, region, layer or section without departing from the teachings of the present invention.

Spatially relative terms, such as "lower", "upper" and the like, may be used herein for ease of description to describe the relationship of one element or feature to another element(s) or feature(s) as illustrated in the figures. It will be understood that the spatially relative terms are intended to encompass different orientations of the device in use or operation, in addition to the orientation depicted in the figures. For example, if the device in the figures is turned over, elements described as "lower" relative to other elements or features would then be oriented "upper" relative the other elements or features. Thus, the exemplary term "lower" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Embodiments of the disclosure are described herein with reference to cross-section illustrations that are schematic illustrations of idealized embodiments (and intermediate structures) of the disclosure. As such, variations from the shapes of the illustrations as a result, for example, of manufacturing techniques and/or tolerances, are to be expected. Thus, embodiments of the disclosure should not be construed as limited to the particular shapes of regions illustrated herein but are to include deviations in shapes that result, for example, from manufacturing.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A visible light communications device comprising:
   a wireless network communications unit that performs communications by using a wireless protocol, wherein the wireless network communications unit to provide a fixed identifier;
   a visible light transmitting unit that transmits the fixed identifier using a visible light communications protocol; and
   a controller that controls the visible light transmitting unit such that the visible light transmitting unit selectively transmits the fixed identifier, using the visible light communications protocol, based on whether the wireless network communications unit is connected to a first wireless network,
   wherein the visible light transmitting unit transmits the fixed identifier at a first interval when the wireless network communications unit is not connected to the first wireless network,
   the visible light transmitting unit transmits the fixed identifier at a second interval when the wireless network communications unit is connected to the first wireless network, and
   the first interval is shorter than the second interval.

2. The visible light communications device of claim 1, wherein the fixed identifier includes a media access control (MAC) address of the wireless network communications unit or the controller.

3. The visible light communications device of claim 1, wherein when the wireless network communications unit receives a first message requesting to join the first wireless network, the wireless network communications unit then transmits the fixed identifier to a wireless network controller such that the wireless network communications unit connects to the first wireless network, and
   the controller of the visible light communications device controls the visible light transmitting unit such that the visible light transmitting unit transmits the fixed identifier at the second interval.

4. The visible light communications device of claim 1, wherein when the wireless network communications unit is determined to be disconnected from the first wireless network, the controller controls the visible light transmitting unit such that the visible light transmitting unit transmits the fixed identifier at the first interval until the wireless network communications unit is connected to a second wireless network.

5. The visible light communications device of claim 1, wherein the wireless network communications unit transmits signals using Zigbee communications protocol, and the wireless network communications unit receives signals using Zigbee communications protocol, and wherein the first wireless network is a Zigbee network that uses Zigbee communications protocol.

6. The visible light communications device of claim 1, wherein the wireless network communications unit transmits signals using Bluetooth communications protocol, and the wireless network communications unit receives signals using Bluetooth communications protocol, and wherein the first wireless network is a Bluetooth network that uses Bluetooth communications protocol.

7. The visible light communications device of claim 1, wherein the visible light communications device is a luminaire, and the visible light transmitting unit is integrally coupled to a light emitting device of the luminaire, and wherein the controller separates operation of the visible light transmitting unit based on cycle, the controller controls the visible light transmitting unit such that the visible light transmitting unit transmits the fixed identifier during a visible light communications (VLC) transmission period of the cycle, and wherein a length of the VLC transmission period varies depending on a length of the fixed identifier.

8. The visible light communications device of claim 7, wherein the cycle includes the VLC transmission period and a dimming period when the wireless network communications unit is not connected to the first wireless network, and wherein the cycle includes only the dimming period, and without the VLC transmission period, when the wireless network communications unit is connected to the first wireless network.

9. The visible light communications device of claim 7, wherein the controller randomly sets the VLC transmission period in the cycle.

* * * * *